(12) United States Patent
Kramer et al.

(10) Patent No.: US 7,094,035 B2
(45) Date of Patent: Aug. 22, 2006

(54) HYBRID BLADE FOR THERMAL TURBOMACHINES

(75) Inventors: Thomas Kramer, Ennetbaden (CH); Andreas Kuenzler, Baden (CH); Mohamed Yousef Nazmy, Fislisbach (CH); Markus Staubli, Dottikon (CH)

(73) Assignee: ALSTOM Technology Ltd., Baden (CH)

( * ) Notice: Subject to any disclaimer, the term of this patent is extended or adjusted under 35 U.S.C. 154(b) by 202 days.

(21) Appl. No.: 10/775,139

(22) Filed: Feb. 11, 2004

(65) Prior Publication Data

US 2004/0223850 A1 Nov. 11, 2004

(30) Foreign Application Priority Data

Feb. 13, 2003 (DE) ................. 103 05 912

(51) Int. Cl.
*F01D 5/14* (2006.01)
(52) U.S. Cl. ................. 416/241 R; 415/12
(58) Field of Classification Search ........... 415/12, 415/200; 416/241 R, 241 B, 248
See application file for complete search history.

(56) References Cited

U.S. PATENT DOCUMENTS

| | | | | |
|---|---|---|---|---|
| 2,749,029 A | * | 6/1956 | Goetzel et al. | 416/241 R |
| 2,775,426 A | * | 12/1956 | Barrett, Jr. et al. | 416/219 R |
| 3,883,267 A | * | 5/1975 | Baudier et al. | 416/230 |
| 4,098,559 A | * | 7/1978 | Price | 416/230 |
| 6,049,978 A | * | 4/2000 | Arnold | 29/889.1 |
| 6,139,278 A | * | 10/2000 | Mowbray et al. | 416/229 A |
| 6,607,358 B1 | * | 8/2003 | Finn et al. | 416/224 |

FOREIGN PATENT DOCUMENTS

| | | |
|---|---|---|
| DE | 1 551 176 | 1/1970 |
| DE | 100 13 373 | 9/2001 |
| DE | 101 10 102 | 8/2002 |
| EP | 0 513 407 | 7/1995 |
| WO | WO 99/27234 | 6/1999 |

OTHER PUBLICATIONS

Search Report from DE 103 05 912.1 (Feb. 13, 2003).

* cited by examiner

*Primary Examiner*—Edward K. Look
*Assistant Examiner*—Devin Hanan
(74) *Attorney, Agent, or Firm*—Cermak & Kenealy, LLP; Adam J. Cermak

(57) ABSTRACT

The invention relates to a hybrid blade (1) for thermal turbomachines, having an airfoil (2) made of a metallic material of a certain density, and having a blade root (3). It is characterized in that the blade root (3), compared with the airfoil (2), is made of a different metallic material having a lower density, and in that the airfoil (20) is connected to the blade root (3) in a positive-locking manner. The blade in this case is advantageously a compressor blade, in particular a high-pressure compressor blade, in which the airfoil (2) is made of a stainless CrNi steel and the blade root (3) is made of a high-temperature titanium alloy or an intermetallic gamma titanium aluminide alloy or an intermetallic orthorhombic titanium aluminide alloy.

6 Claims, 6 Drawing Sheets

HYBRID BLADE FOR THERMAL TURBOMACHINES

BACKGROUND OF THE INVENTION

1. Field of the Invention

The invention relates to the field of power plant technology. It relates to a hybrid blade for thermal turbomachines according to the preamble of patent claim 1.

2. Discussion of Background

Thermal turbomachines, i.e. turbines and compressors, essentially comprise a rotor fitted with moving blades and a stator in which guide blades are suspended. The moving blades and the guide blades in turn essentially comprise an airfoil and a blade root. In order to be able to fasten the blades on the rotor or in the stator, slots are recessed in the stator and on the rotor shaft. The roots of the guide and moving blades are pushed into these slots and locked there.

The fixed guide blades have the task of directing the flow of the gaseous medium to be compressed or of the gaseous medium to be expanded onto the rotating moving blading in such a way that the energy conversion takes place with the best possible efficiency.

It is known to produce blades in one piece from a single material, e.g. from a nickel-base superalloy for gas turbines or from stainless steel for compressors. Such blades are referred to below as conventional blades.

It is also known to produce blades in a hybrid type of construction. In the hybrid type of construction, various materials having different physical properties are combined with one another in order to obtain an optimum design of a blade. Thus, for example, a hybrid rotor blade for a propulsion plant has been disclosed by DE 101 10 102 A1, in which hybrid rotor blade the airfoil trailing edge, which has only an aerodynamic function, is produced from a lightweight construction material, preferably a fiber composite, e.g. a carbon-fiber composite material. The weight of the blade can be advantageously reduced by such a (light) trailing edge. The two airfoil parts (heavy metallic leading edge and light trailing edge made of fiber composite material) are connected by adhesive bonding or riveting.

A similar solution is described in WO 99/27234. A rotor having integral blading, in particular for a propulsion plant, is disclosed there, rotor blades being arranged on said rotor circumferentially, the rotor blades having, for reducing vibrations, a metallic blade root, a metallic airfoil section, which forms at least part of the blade leading edge and the adjoining region of the blade surface, and an airfoil made of fiber-reinforced plastic. Here, too, the airfoil of plastic is fastened to the metallic airfoil section by adhesive bonding/ riveting or by clamping.

This known prior art has the following disadvantages. On the one hand, said types of fastening do not withstand high loads over a long period; on the other hand, the fiber-reinforced plastics can be used only within certain temperature ranges, so that these known technical solutions are in particular suitable only for propulsion plant technology. In addition, the characteristic of the airfoil (mechanical properties, oxidation resistance, friction properties) is changed relative to the airfoils made of a single material, a factor which may have an adverse effect on the operating behavior of the machine.

Furthermore, EP 0 513 407 B1 discloses a turbine blade which is made of an alloy on the basis of a dopant-containing gamma titanium aluminide and comprises an airfoil, a blade root and possibly a blade shroud band. During the production of this blade, the cast body is partly heat-treated and hot-worked in such a way that the airfoil subsequently has a coarse-grained structure which leads to high tensile and creep strength, and that the blade root and/or the blade shroud band has a fine-grained structure which leads to increased ductility compared with the airfoil. However, weight reductions compared with conventional blades cannot be realized in this way.

SUMMARY OF THE INVENTION

Accordingly, one object of the invention, in attempting to avoid the aforesaid disadvantages of the prior art, is to develop a hybrid blade, i.e. a blade made of different materials, for thermal turbomachines which, on account of a reduced weight, increases the service life in particular of the rotor/blade fastening. The blade is to be comparatively simple to produce. Furthermore, the characteristic of the airfoil compared with conventional blades is to be retained. In addition, the fastening of the parts made of different materials is also to withstand extremely severe stress conditions, such as high temperatures and high centrifugal forces, even during long operating periods.

According to the invention, in the case of a hybrid blade for thermal turbomachines according to the preamble of patent claim 1 this object is achieved in that the blade root, compared with the airfoil, is made of a different metallic material having a lower density, and that the airfoil is connected to the blade root in a positive-locking manner.

The advantages of the invention consist in the fact that the hybrid blade according to the invention has a lower weight, compared with a conventional blade, in which both the airfoil and the blade root consist of the same metallic material. In particular, the service life of the rotor/blade fastening is increased as a result. The characteristic of the airfoil is retained compared with conventional blades. In addition, as a result of the positive-locking mechanical connection of airfoil and blade root, i.e. the parts made of different materials, the blade also withstands extremely severe stress conditions, such as high temperatures, high centrifugal forces, long operating periods, etc. There is thus, for example, no metallurgical connection between the two parts, which metallurgical connection could weaken the structure.

It is advantageous if the blade according to the invention is a compressor blade, in particular a high-pressure compressor blade, in which the airfoil is made of a stainless CrNi steel and the blade root is made of a high-temperature titanium alloy or an intermetallic gamma TiAl compound or an intermetallic orthorhombic TiAl compound, since the material use according to the invention leads to a considerable weight reduction in the blade.

The high-pressure compressor blades have relatively thin airfoils and relatively large compact blade roots. If the lower specific density of the material of the blade root compared with the material of the airfoil (only about 50–70%) is also taken into account in addition to these differences in the geometrical masses, the enormous weight saving compared with conventional blades then becomes obvious. In particular, in the case of the rotating moving blades of a high-pressure compressor, which blades may be exposed to temperatures up to about 600° C., this advantageously leads to an increase in the service life of the rotor/stator connection.

Furthermore, it is expedient if the blade according to the invention is a turbine blade in which the airfoil is made of a superalloy, for example a nickel-base superalloy, and the blade root is made of a high-temperature titanium alloy or an intermetallic gamma titanium aluminide alloy or an intermetallic orthorhombic titanium aluminide alloy. Here, too, the weight of the blade is reduced compared with conventional blades which consist of a single material, for example a nickel-base superalloy.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
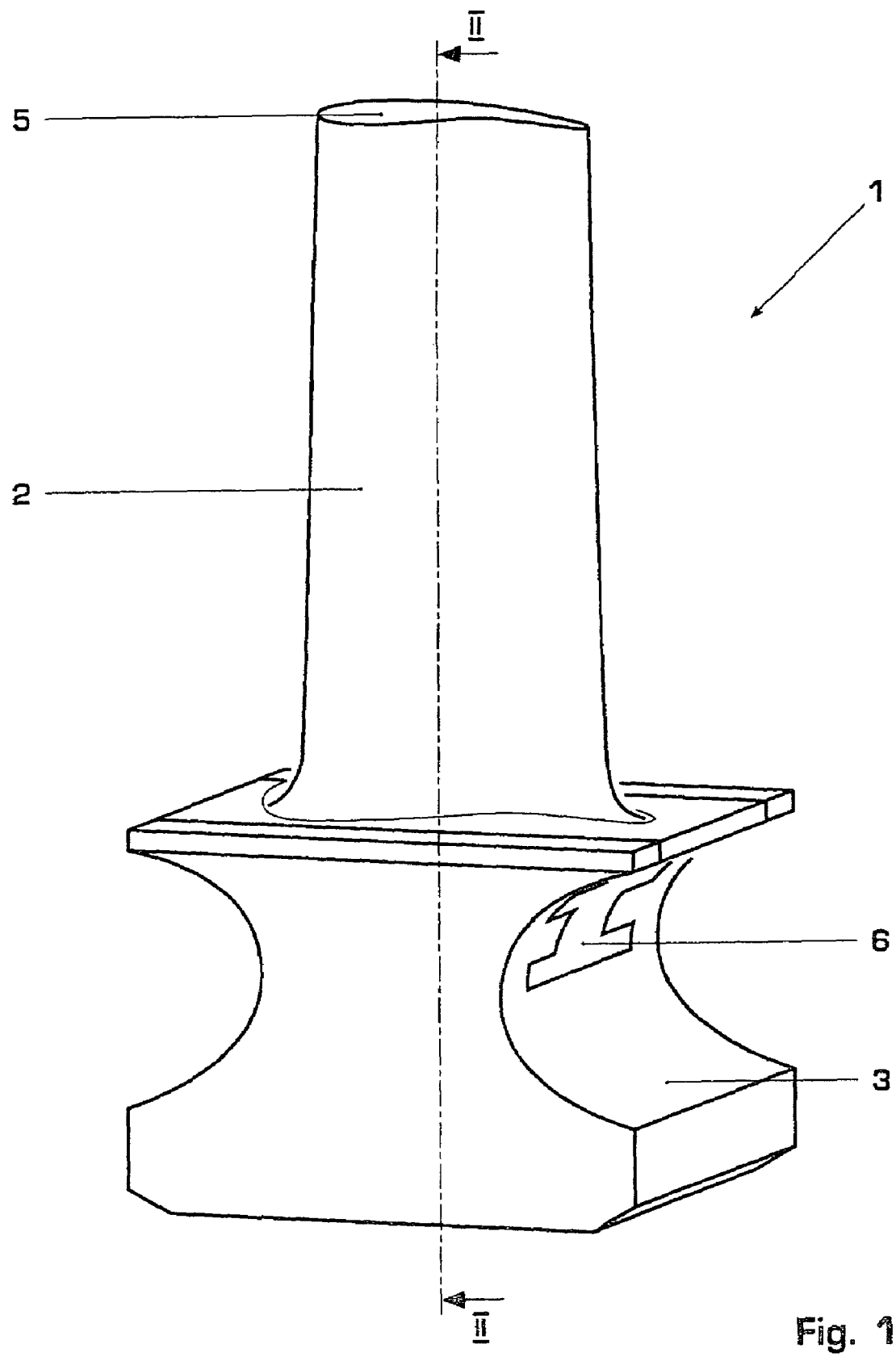
FIG. 1 shows a perspective representation of a high-pressure compressor blade according to the invention.
Figure 2:
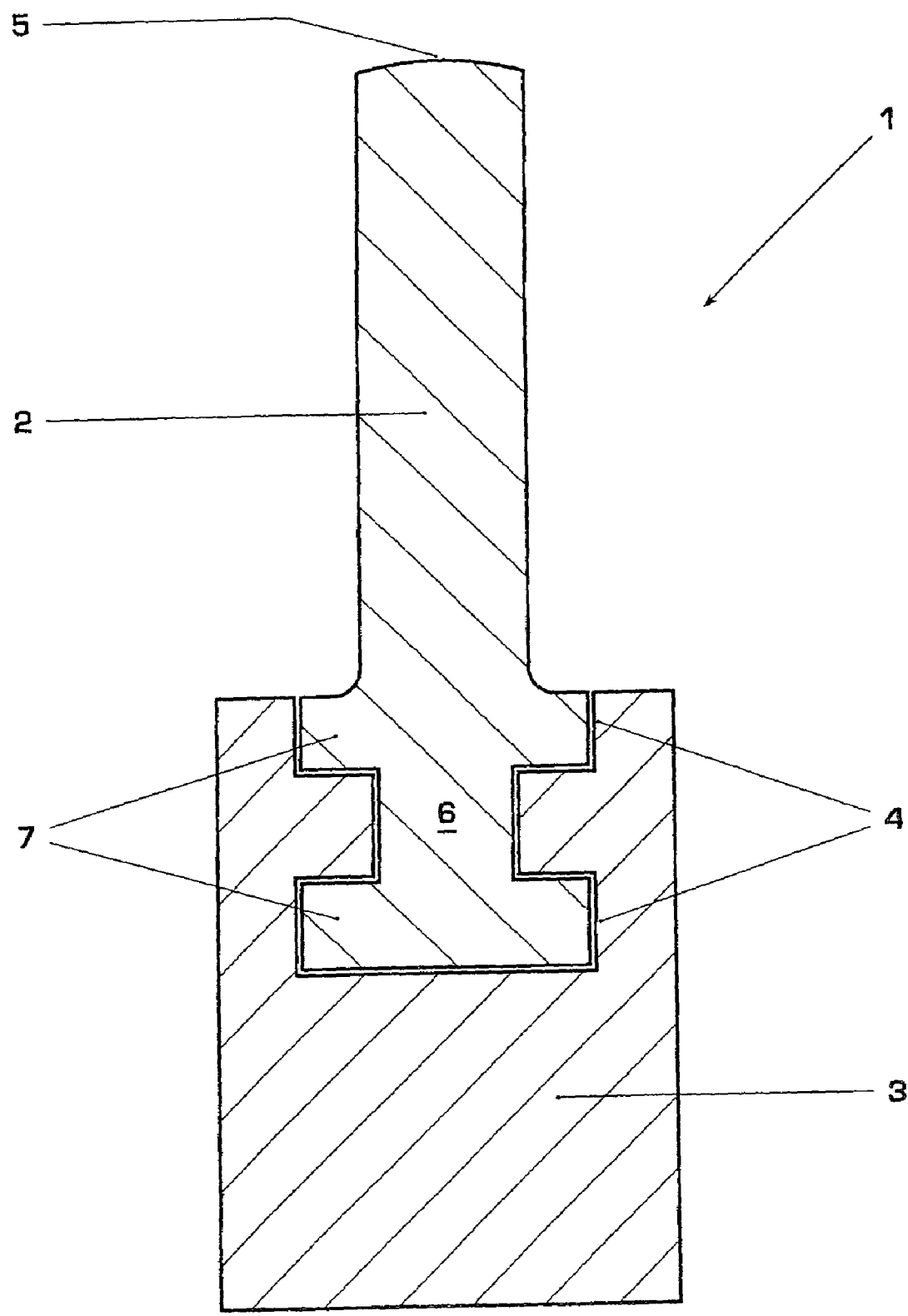
FIG. 2 shows a longitudinal section of the blade along line II—II according to FIG. 1.

Referring now to the drawings, wherein like reference numerals designate identical or corresponding parts throughout the several views, FIG. 1 shows a perspective representation of a hybrid blade 1 according to the invention, whereas FIG. 2 shows a longitudinal section of the hybrid blade 1 along line II—II according to FIG. 1. In the present exemplary embodiment, the blade is the moving blade of a high-pressure compressor of a gas turbine. Such moving blades are exposed, for example, to a temperature of about 600° C. for several thousand hours at a pressure of about 32 bar.

The hybrid blade 1 according to the invention comprises an airfoil 2 and a blade root 3. As is the known prior art, the airfoil 2 of the high-pressure compressor is of relatively thin design and is produced from a stainless CrNi steel. According to the invention, the blade root 3, which compared with the airfoil 2 of the blade 1 is relatively compact and designed with a large surface area, is produced from a material having a lower density than the density of the material from the which the airfoil 2 is produced. In the present exemplary embodiment, the blade root 3 is made of a Ti alloy (almost α phase).

In detail, the stainless steel of the airfoil 2 has the following chemical composition (in % by weight) 0.12 C, <0.8 Si, <1.0 Mn, 17 Cr, 14.5 Ni, <0.5 Mo, 3.3 W, <1 Ti, <0.045 P, <0.03 S, remainder Fe.

By contrast, the Ti alloy of the blade root 3 has the following chemical composition (in % by weight): 0.06 C, 0.4 Si, 5.8 Al, 4 Sn, 4 Zr, 0.5 Mo, <0.05 Fe, 0.11 O, <0.03 N, <0.006 H, remainder Ti.

The physical properties of the two alloys are compared in Table 1.

TABLE 1

Physical properties of the different materials of the hybrid blade according to the invention.

| | Density in g/cm$^3$ | Coefficient of thermal expansion in K$^{-1}$ |
|---|---|---|
| Ti alloy | 4.55 | $10.9 \times 10^{-6}$ |
| Stainless steel | 7.9 | $18.6 \times 10^{-6}$ |

The Ti high-temperature alloy used for the blade root 3 has only a density which is about 58% of the density of the stainless CrNi steel for the airfoil 2. The coefficient of thermal expansion of the material of the blade root is likewise only about 59% of the coefficient of thermal expansion of the stainless steel for the airfoil 2. Since the airfoil 2 in the case of the high-pressure compressor blades is relatively thin and the blade root 3 has substantially larger geometric dimensions than the airfoil 2, an enormous weight saving is obtained for the hybrid blades 1 according to the invention compared with conventional blades for high-pressure compressors, in which both the airfoil 1 and the blade root 2 are produced from stainless CrNi steel. Since the rotating moving blades of a high-pressure compressor of a gas turbine plant are highly stressed at temperatures up to about 600° C., the weight reduction advantageously leads to an increase in the service life of the rotor/stator connection.

According to the invention, the airfoil 2 is mechanically fixed in the blade root 3 by positive locking being realized between the two parts 2 and 3. To this end, as can readily be seen from FIG. 2, recesses 4 into which the airfoil 2 is pushed in a positive-locking manner are provided in the blade root 3. For this purpose, the airfoil 2 has, at its end 6 opposite the blade tip 5, projections 7 which are matching counterparts of the recesses 4. Such a positive-locking mechanical connection of airfoil 2 and blade root 3 ensures that the connection of the two parts 2 and 3 is permanent even under high stress conditions. In addition, the characteristic of the airfoil 2 compared with conventional blades is advantageously retained.

Figure 3:
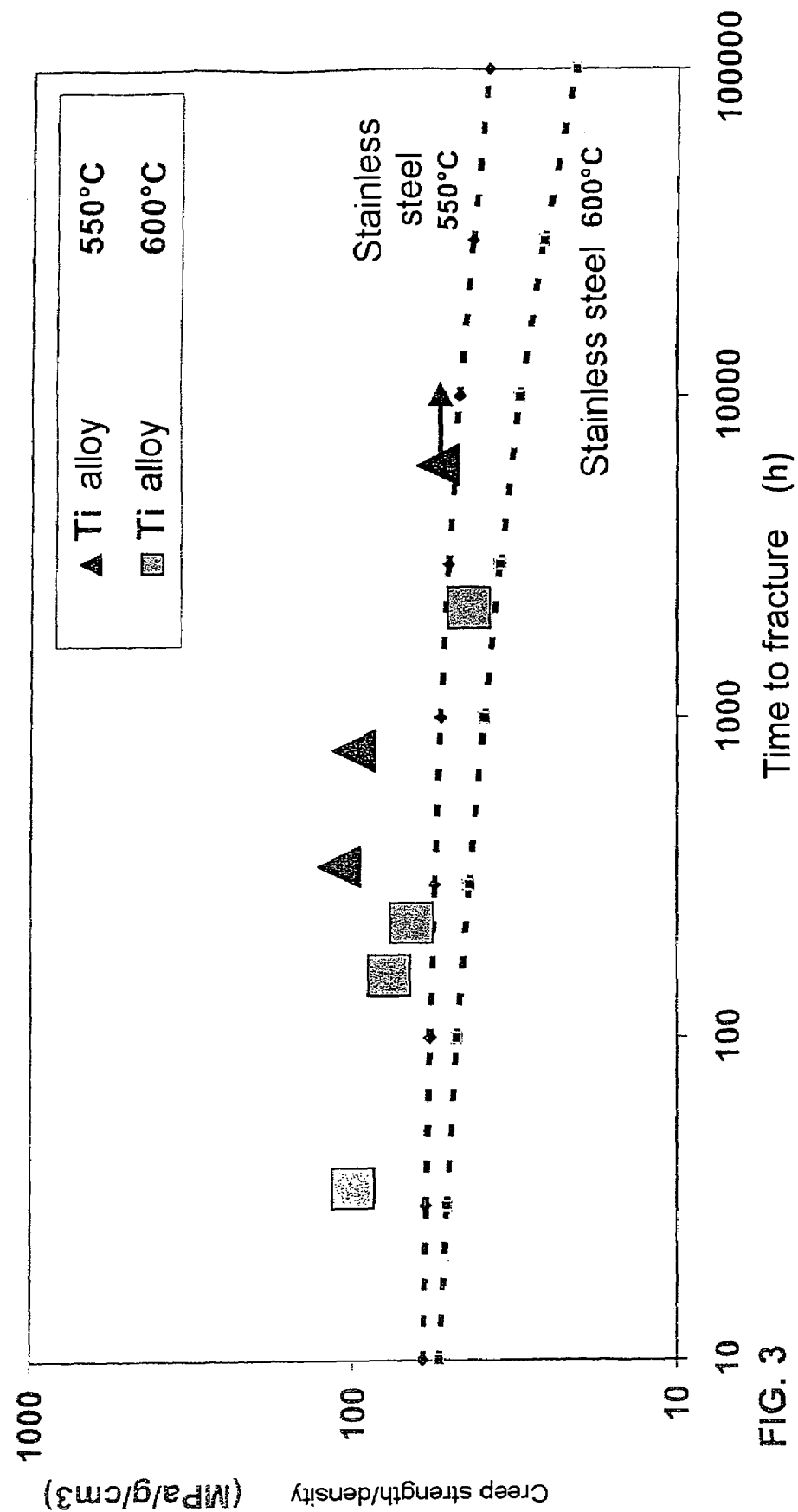
FIG. 3 shows the creep strength, related to the density, for a Ti alloy or a stainless steel plotted against the time to fracture.

The creep strength, related to the density, for the above-described Ti alloy or the stainless CrNi steel plotted against the time to fracture is shown in FIG. 3, to be precise at stress temperatures of 550° C. and 600° C. The light Ti alloy used for the blade root 3 has better values than the stainless steel at both temperatures over the entire time range tested.

Figure 4:
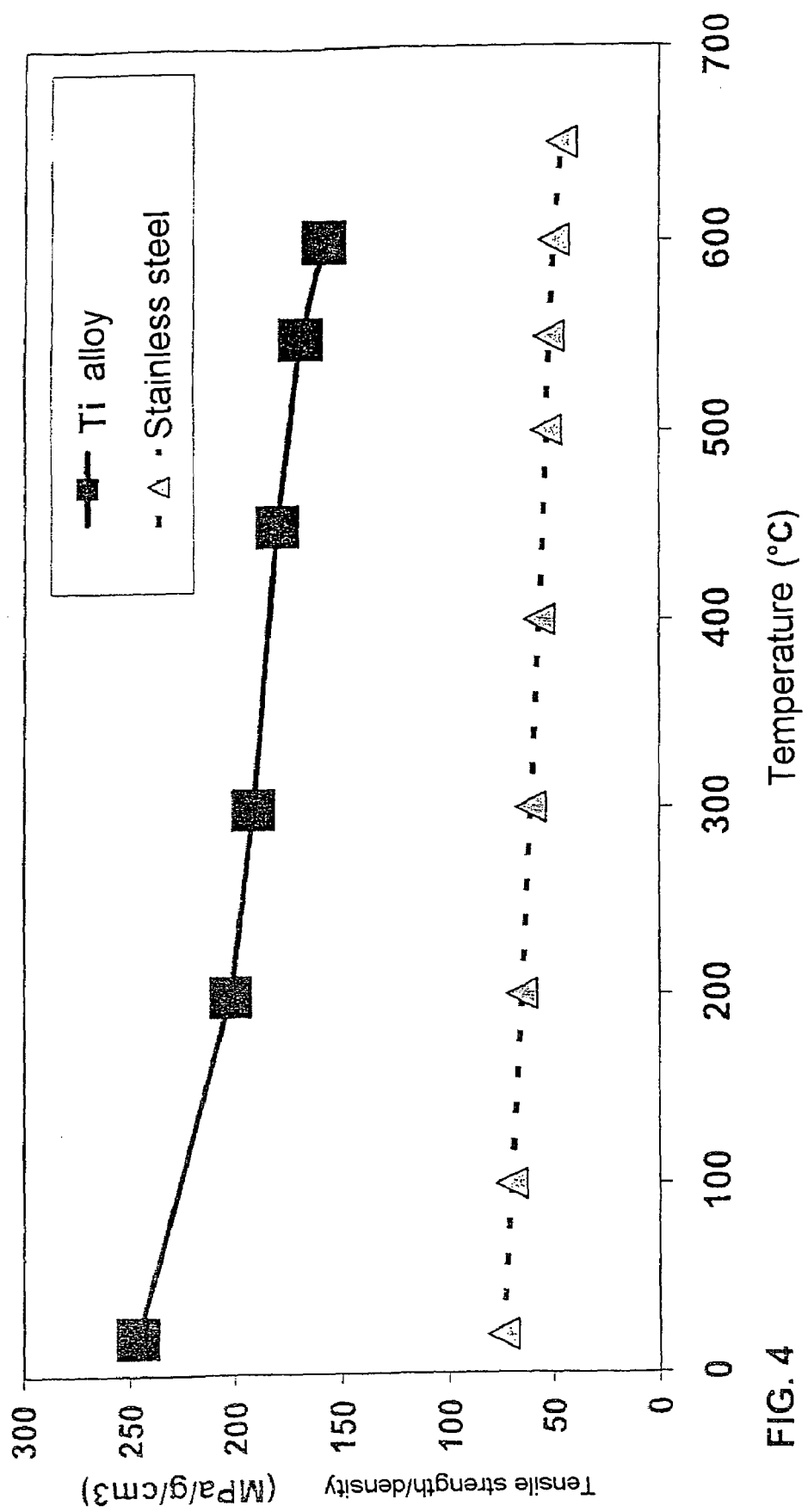
FIG. 4 shows the tensile strength, related to the density, for a Ti alloy or a stainless steel plotted against the temperature.

FIG. 4 shows the tensile strength, related to the density, for the above-described Ti alloy or the stainless steel plotted against the temperature within the range from room temperature up to 650° C. The Ti alloy has better values than the stainless steel over the entire temperature range.

Figure 5:
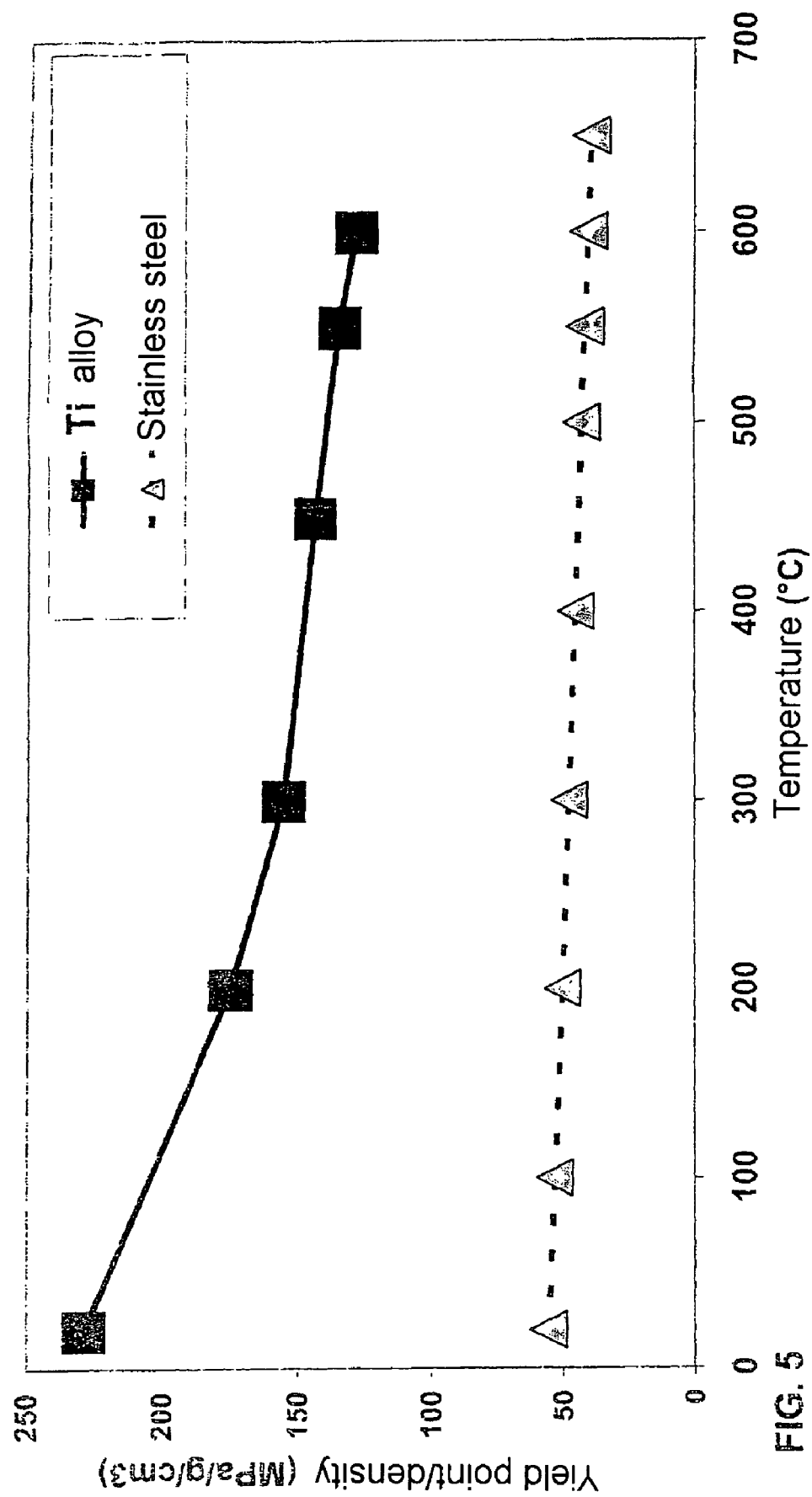
FIG. 5 shows the yield point, related to the density, for a Ti alloy or a stainless steel plotted against the temperature.

This also applies to the plot shown in FIG. 5 of the yield point related to the density. Here, too, the Ti alloy has better values than the stainless steel.

Figure 6:
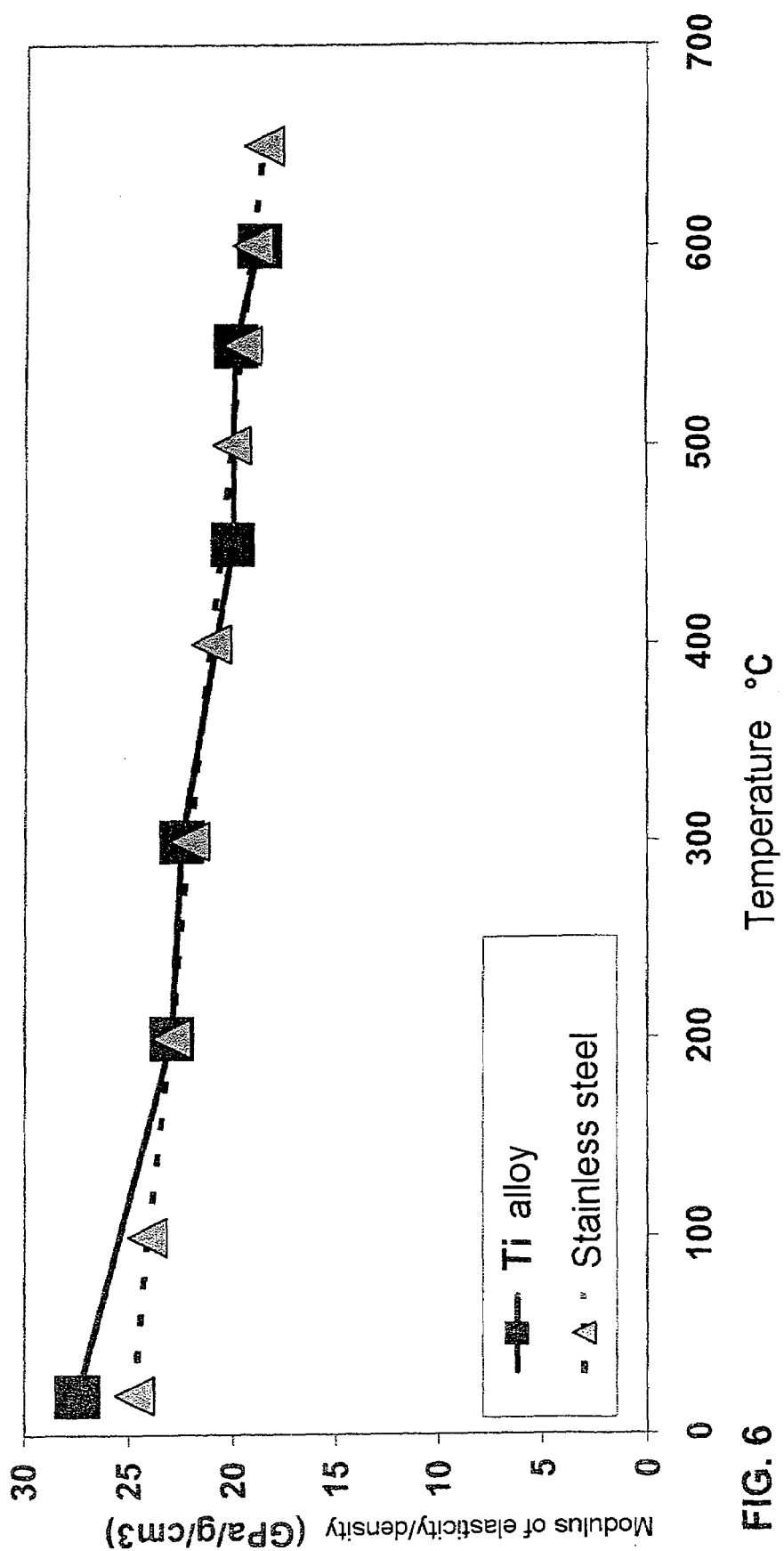
FIG. 6 shows the modulus of elasticity, related to the density, for a Ti alloy or a stainless steel plotted against the temperature.

The modulus of elasticity, related to the density, for the above-described Ti alloy or the stainless CrNi steel plotted against the temperature within the range from room temperature up to 650° C. is shown in FIG. 6. Whereas the Ti alloy is slightly superior to the steel within the lower temperature range, from about 200° C. both alloys have approximately the same modulus of elasticity values related to the density.

The invention is of course not restricted to the exemplary embodiment described.

For example, the blade root 3 of the hybrid blade 1 of the high-pressure compressor may also be produced from a known intermetallic gamma titanium aluminide alloy having a density of only 4.12 g/cm³ (e.g. Ti-47 Al-2Nb-2Mn-0.8% TiB$_2$), whereas the airfoil is again produced from CrNi steel. This has the advantage of an even greater weight reduction on account of the even lower density of the material of the blade root 3 and thus of a prolongation of the service life of the blade. In addition, higher operating temperatures of up to 700–750° C. can thus be realized with the same airfoil characteristic.

An intermetallic orthorhombic titanium aluminide alloy likewise known from the prior art and having a density of 4,55 g/cm³ is also suitable for the blade root 3. Orthorhombic titanium aluminide alloys are based on the nonstoichiometric compound Ti$_2$AlNb and have the following composition Ti-(22–27)Al-(21–27)Nb.

Furthermore, it is conceivable for the hybrid blade 1 to be used as a guide blade, or it is used as a turbine blade in which the airfoil 2 is made of a superalloy, for example a nickel-base superalloy, and the blade root 3 is made of a high-temperature titanium alloy or an intermetallic gamma titanium aluminide alloy or an intermetallic orthorhombic titanium aluminide alloy. Weight reductions and an increase in the service life of the rotor/stator connection can thus also be achieved.

Obviously, numerous modifications and variations of the present invention are possible in light of the above teachings. It is therefore to be understood that, within the scope of the appended claims, the invention may be practiced otherwise than as specifically described herein.

List of Designations
1 Hybrid blade
2 Airfoil
3 Blade root
4 Recess in the blade root
5 Blade tip
6 End of the blade root opposite the blade tip
7 Projection

What is claimed as new and desired to be secured by Letters Patent of the United States is:

1. A hybrid blade for thermal turbomachines, the blade comprising:
    an airfoil made of a stainless CrNi steel material of a first density;
    a blade root made of a second metallic material having a second density lower than the first density;
    wherein the airfoil is connected to the blade root in a positive-locking manner;
    wherein the blade comprises a compressor blade; and
    wherein the blade root second metallic material is selected from the group consisting of a high-temperature titanium alloy, an intermetallic gamma titanium aluminide alloy, and an intermetallic orthorhombic titanium aluminide alloy.

2. A hybrid blade for thermal turbomachines, the blade comprising:
    an airfoil made of a superalloy metallic material of a first density;
    a blade root made of a second metallic material having a second density lower than the first density;
    wherein the airfoil is connected to the blade root in a positive-locking manner;
    wherein the blade comprises a turbine blade; and
    wherein the blade root second metallic material is selected from the group consisting of a high-temperature titanium alloy, an intermetallic gamma titanium aluminide alloy, and an intermetallic orthorhombic titanium aluminide alloy.

3. The hybrid blade as claimed in claim 1, wherein the blade comprises a moving blade.

4. The hybrid blade as claimed in claim 1, wherein the compressor blade comprises a high-pressure compressor blade.

5. The hybrid blade as claimed in claim 2, wherein the superalloy comprises a nickel-based superalloy.

6. The hybrid blade as claimed in claim 2, wherein the blade comprises a moving blade.

* * * * *